US006767519B2

(12) United States Patent
Sakashita et al.

(10) Patent No.: US 6,767,519 B2
(45) Date of Patent: Jul. 27, 2004

(54) CHEMICAL DECONTAMINATION LIQUID DECOMPOSING SYSTEM HAVING CATALYST TOWER AND CATALYST TOWER THEREFOR

(75) Inventors: Motoaki Sakashita, Hitachi (JP); Katsuo Yokota, Hitachi (JP); Yasushi Kobayashi, Tokai (JP); Kazumi Anazawa, Hitachi (JP)

(73) Assignees: Hitachi, Ltd., Tokyo (JP); Hitachi Engineering Co. Ltd., Ibaraki (JP)

( * ) Notice: Subject to any disclaimer, the term of this patent is extended or adjusted under 35 U.S.C. 154(b) by 685 days.

(21) Appl. No.: 09/791,693

(22) Filed: Feb. 26, 2001

(65) Prior Publication Data

US 2001/0022954 A1 Sep. 20, 2001

(30) Foreign Application Priority Data

Mar. 15, 2000 (JP) ........................................ 2000-077767

(51) Int. Cl.[7] ................. B01J 8/00; B01J 8/02
(52) U.S. Cl. ........................................ 422/211
(58) Field of Search .................. 422/188, 208, 422/211, 218–220, 239, 242, 261, 274–277, 294, 305, 306; 48/61

(56) References Cited

U.S. PATENT DOCUMENTS

| 4,705,621 A | * | 11/1987 | Penick ........................ 208/146 |
| 5,236,663 A | * | 8/1993 | Alagy et al. ................ 422/211 |
| 5,449,501 A | * | 9/1995 | Luebke et al. .............. 422/193 |
| 5,961,933 A | * | 10/1999 | Casanave et al. ........... 422/211 |

FOREIGN PATENT DOCUMENTS

| CA | 1107039 | 8/1981 |
| CA | 1318478 | 6/1993 |
| JP | 4-122192 | 4/1992 |
| JP | 6-190217 | 7/1994 |
| JP | 7-253496 | 10/1995 |
| JP | 8-1147 | 1/1996 |
| JP | 105295 | 4/2000 |
| WO | 98/47824 | 10/1998 |

\* cited by examiner

Primary Examiner—Samuel M. Heinrich
(74) Attorney, Agent, or Firm—Mattingly, Stanger & Malur, P.C.

(57) ABSTRACT

An object of the present invention is to provide a chemical decontamination liquid decomposing system having a catalyst tower which has a mesh filter capable of certainly preventing catalyst from flowing out and a mechanism of pushing-down the catalyst capable of preventing convection of the catalyst caused by decomposition gas.

The catalyst tower in accordance with the present invention used for decomposing a chemical decontamination liquid comprises an inlet pipe, a catalyst for decomposing the chemical decontamination liquid, an outlet mesh filter for preventing the catalyst from flowing out, an outlet pipe, a catalyst charging port for charging the catalyst, a catalyst pushing-down mechanism for preventing occurrence of convection of the catalyst caused by a decomposed gas and so on. The outlet mesh filter is arranged so as to closely attached to the inner surface of the catalyst tower and to the inner surface of the catalyst charging port.

13 Claims, 6 Drawing Sheets

CHEMICAL DECONTAMINATION LIQUID DECOMPOSING SYSTEM HAVING CATALYST TOWER AND CATALYST TOWER THEREFOR

BACKGROUND OF THE INVENTION

1. Field of the Invention

The present invention relates to a catalyst tower and a chemical decontamination liquid decomposing system having the catalyst tower.

2. Description of the Prior Art

Figure 6:
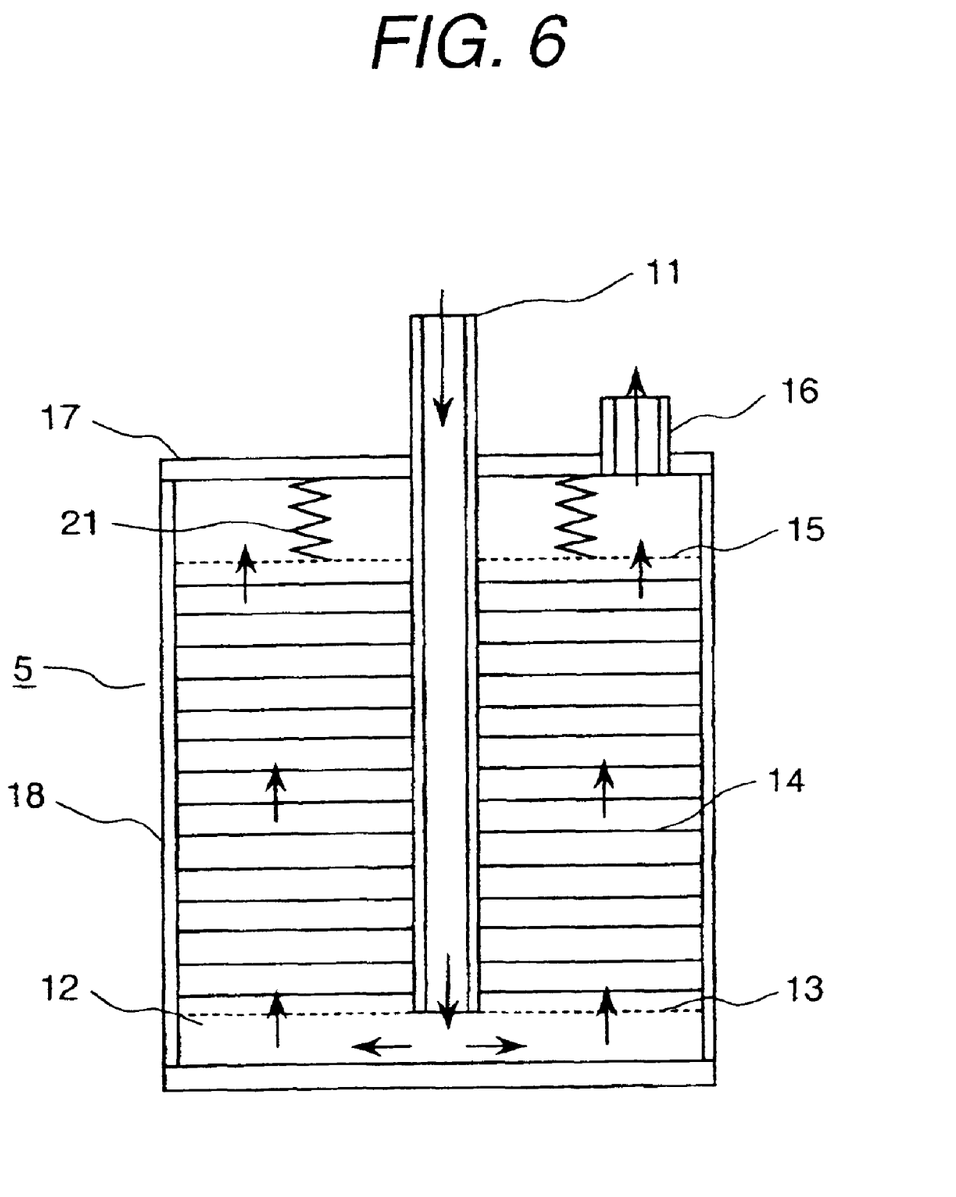
FIG. 6 is a view showing the structure of an example of a conventional catalyst tower.

FIG. 6 is a view showing the structure of an example of a conventional catalyst tower. In this catalyst tower, a chemical decontamination liquid flowing out of an inlet pipe 11 is turned upward and distributed in a lower chamber 12, and after that, flows through an inlet mesh filter 13, and flows upward in a catalyst 14, and then flows through an outlet mesh filter 15 to be discharged through an outlet pipe 16. When the catalyst is charged in a catalyst tower container 18, the catalyst is charged by removing a catalyst tower upper lid 17 and the outlet mesh filter 15. Further, in order to prevent the catalyst from occurring convection inside the catalyst tower container 18 due to a gas produced by decomposition reaction of the chemical decontamination liquid, the outlet mesh filter 15 is constructed so as to push down the catalyst using springs 21. Therefore, the outlet mesh filter 15 needs to have a detachable and movable structure.

In order to made the structure of the outlet mesh filter 15 detachable and movable, it is necessary that gaps are provided both in a portion between the outer periphery of the outlet mesh filter 15 and the inner peripheral wall of the catalyst tower container 18, and in a penetration portion of the inlet pipe 11 of the outlet mesh filter 15. The gaps need to be made as small as possible from the viewpoint of preventing the catalyst from flowing out. Although the penetration portion of the inlet pipe 11 of the outlet mesh filter 15 can be eliminated by making the inlet pipe 11 so as to penetrate the side wall portion of the catalyst tower container 18, it is uneconomical because the height of the catalyst tower container 18 is increased and accordingly a shielding container for containing the catalyst tower 5 becomes larger. Further, another method of narrowing the gaps considered is that O-rings are provided in the outer periphery of the outlet mesh filter 15 and in a penetration portion of the inlet pipe 11, but in that case, the movability of the outer mesh filter 15 is decreased to deteriorate the function of pushing down the catalyst.

SUMMARY OF THE INVENTION

An object of the present invention is to provide a chemical decontamination liquid decomposing system having a catalyst tower which has a mesh filter capable of certainly preventing catalyst from flowing out and a mechanism of pushing-down the catalyst capable of preventing convection of the catalyst caused by decomposition gas.

One of embodiment to attain the above object is a catalyst tower which comprises an outlet mesh filter arranged between a catalyst for decomposing the chemical decontamination liquid and an outlet pipe for making the chemical decontamination liquid flow out of the catalyst tower; and a catalyst charging port for charging said catalyst, and the outlet mesh filter is arranged so as to closely attached to an inner surface of the catalyst tower and to an inner surface of the catalyst charging port; and a catalyst pushing-down mechanism for suppressing convection of the catalyst is arranged inside the catalyst charging port.

Figure 1:
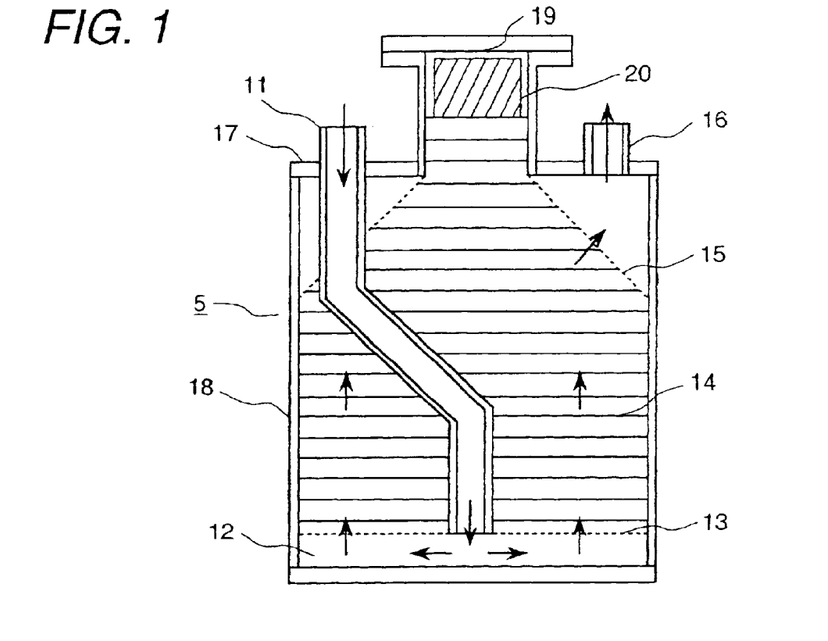
FIG. 1 is a view showing the structure of an embodiment of a catalyst tower in accordance with the present invention.

As a concrete structure, the catalyst charging port 19 is arranged in a catalyst tower upper lid 17, and the catalyst pushing-down mechanism 20 is arranged inside the catalyst charging port 19, as shown in FIG. 1. Further, the outlet mesh filter 15 has a structure closely attached to the inner wall of the catalyst tower container 18 and to the catalyst charging port 19.

According to this structure, the catalyst can be directly charged into the catalyst tower container 18 through the catalyst charging port 19, and accordingly there is no need to remove the catalyst tower upper lid 17 and the outlet mesh filter 15. Further, by arranging the catalyst pushing-down mechanism 20 inside the catalyst charging port 19, there is no need to form the outlet mesh filter 15 movable. By employing such a structure, there is no need to construct the outlet mesh filter 15 detachable and movable. Therefore, the outlet mesh filter 15 can be formed in the structure of closely attaching to the inner wall of the catalyst tower container 18 and to the catalyst charging port 19.

Consequently, it is possible to certainly prevent the catalyst from flowing out through the outlet mesh filter 15. Further, since the catalyst 14 can be certainly pushed down by the catalyst pushing-down mechanism 20 arranged inside the catalyst charging port 19, occurrence of convection of the catalyst caused by the decomposed gas can be prevented.

According to the present invention, it is possible to provide a catalyst tower which can prevent the catalyst from flowing out to the system, and can prevent convection of the catalyst caused by the decomposed gas generated in the catalyst tower from occurring, and to provide a chemical decontamination liquid decomposing system having the catalyst tower.

DESCRIPTION OF THE PREFERRED EMBODIMENTS

Embodiments will be described below, referring to FIG. 1 to FIG. 8. Arrow marks shown in each of the figures indicate flow of the chemical decontamination liquid.

(Embodiment 1)

Figure 2:
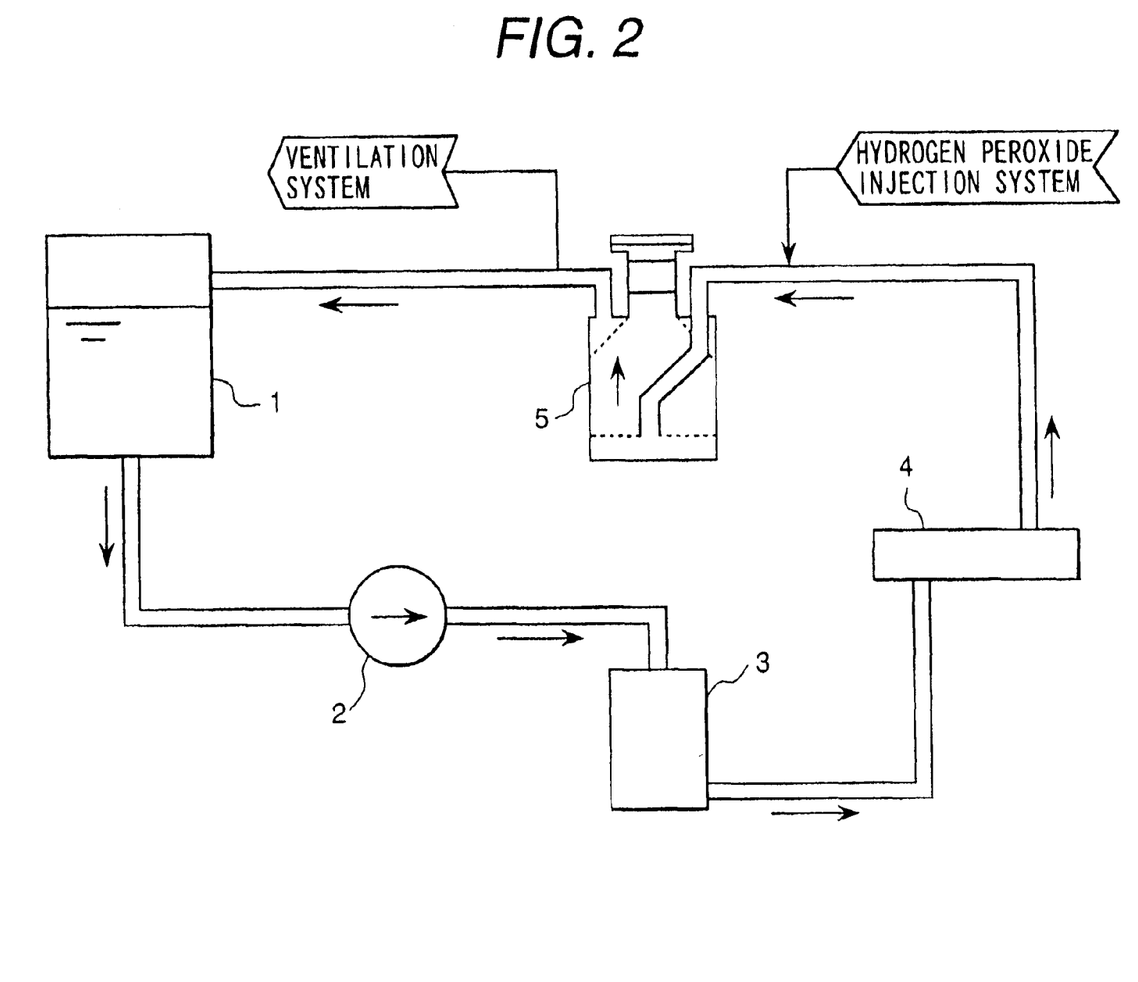
FIG. 2 is a diagram showing the overall structure of a chemical decontamination liquid decomposing system under decomposing a chemical decontamination liquid.

FIG. 2 is a diagram showing the overall structure of a chemical decontamination liquid decomposing system under decomposing a chemical decontamination liquid. A chemical decontamination liquid flowing out from an object 1 to be decontaminated is pressurized (pumped up) by a pump 2 and flows into an ion-exchange resin column 3 to remove metallic ions in the liquid. The chemical decontamination liquid flowing out of the ion-exchange resin column 3 is heated up by a heater 4, and added with hydrogen peroxide in order to accelerate decomposition, and then flows into a catalyst tower 5. The chemical decontamination liquid is decomposed in the catalyst tower 5, and decomposed gas is discharged and the chemical decontamination liquid is returned to the object 1 to be decontaminated to form a closed loop.

FIG. 1 is a view showing the structure of an embodiment of a catalyst tower in accordance with the present invention. The chemical decontamination liquid flows though the inlet pipe 11 of the catalyst tower 5, and then the flow direction of the chemical decontamination liquid is inversely turned in the lower chamber 12. At the same time, the flow of the chemical decontamination liquid is distributed inside the lower chamber 12 to pass through the inlet mesh filter 13. The chemical decontamination liquid passed through the inlet mesh filter 13 is decomposed by chemical reaction while passing between the catalyst 14. Gas generated by the decomposition passes through the outlet mesh filter 15 together with the chemical decontamination liquid to flow out of the outlet pipe 16. When the catalyst is charged into the catalyst tower 5, the catalyst can be directly charged only by removing the catalyst charging port 19 and the catalyst pushing-down mechanism 20.

The outlet mesh filter 15 of the catalyst tower 5 is welded to the inner side wall of the catalyst tower container 18 and to the lower portion of the catalyst charging port 19. Further, the outlet mesh filter 15 is also welded to the outer side wall of the inlet pipe 11 in the penetration portion of the inlet pipe 11. Therefore, the outlet mesh filter 15 has such a structure that there is no gap to make the catalyst 14 flow out. Thereby, it is possible to prevent the catalyst 14 from flowing out.

Furthermore, the catalyst pushing-down mechanism 20 is arranged inside the catalyst charging port 19 of the catalyst tower 5. The catalyst pushing-down mechanism 20 is formed by a weight, and the function of pushing-downward the catalyst 14 is performed by pushing the catalyst using the gravitational force of the weight. By doing so, occurrence of convection of the catalyst 14 caused by the decomposed gas can be prevented. As an example of the catalyst pushing-down mechanism 20, when the catalyst pushing-down mechanism 20 is made of lead and has a thickness of 180 mm, it can push down the catalyst 14 with a pressure approximately 0.02 MPa.

(Embodiment 2)

Figure 3:
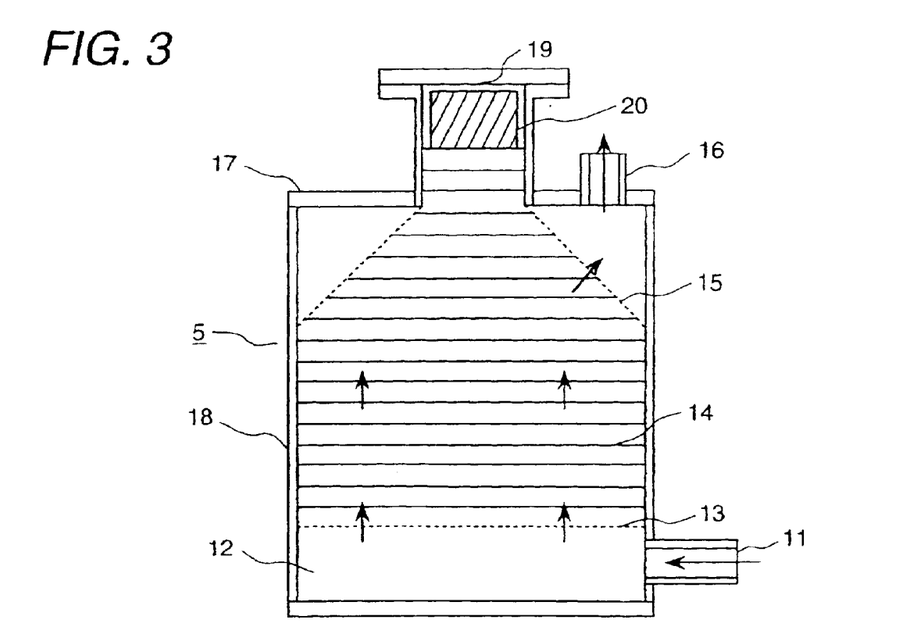
FIG. 3 is a view showing the structure of an embodiment of a catalyst tower in accordance with the present invention.

FIG. 3 is a view showing the structure of another embodiment of a catalyst tower in accordance with the present invention. In this embodiment, the inlet pipe 11 is arranged in the lower portion of the side surface of the catalyst tower container 18 and directly connected to the lower chamber 12. In this case, the same effect as that in Embodiment 1 can be obtained. Further, in the embodiment, since the penetration portion of the inlet pipe 11 can be eliminated in the outlet mesh filter 15, manufacturing ability of the outlet mesh filter 15 can be also improved.

(Embodiment 3)

Figure 4:
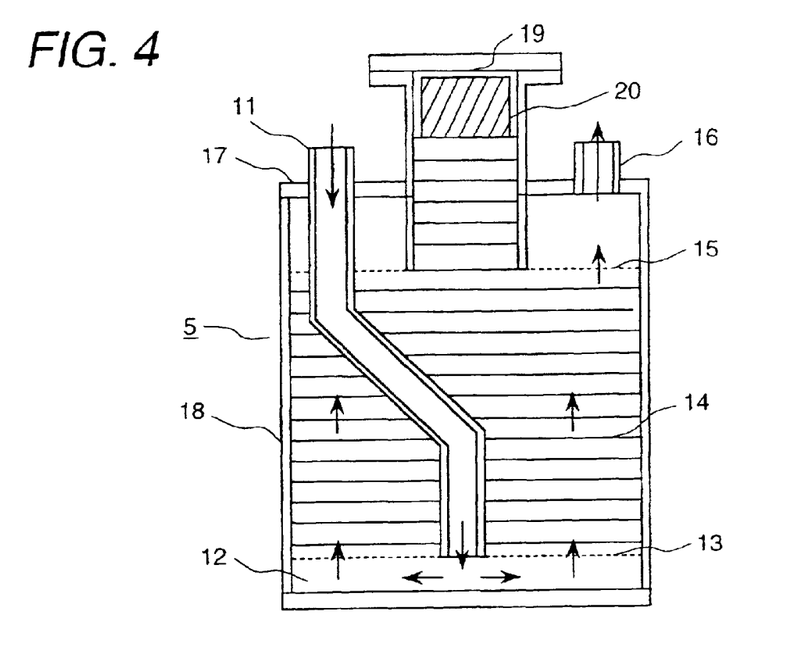
FIG. 4 is a view showing the structure of an embodiment of a catalyst tower in accordance with the present invention.

FIG. 4 is a view showing the structure of another embodiment of a catalyst tower in accordance with the present invention. In this embodiment, the structure of the outlet mesh filter 15 is formed in a disk shape. In this case, the same effect as that in Embodiment 1 can be obtained. Further, in this embodiment, since the structure of the outlet mesh filter 15 can be simplified, manufacturing ability of the outlet mesh filter 15 can be also improved.

(Embodiment 4)

Figure 5:
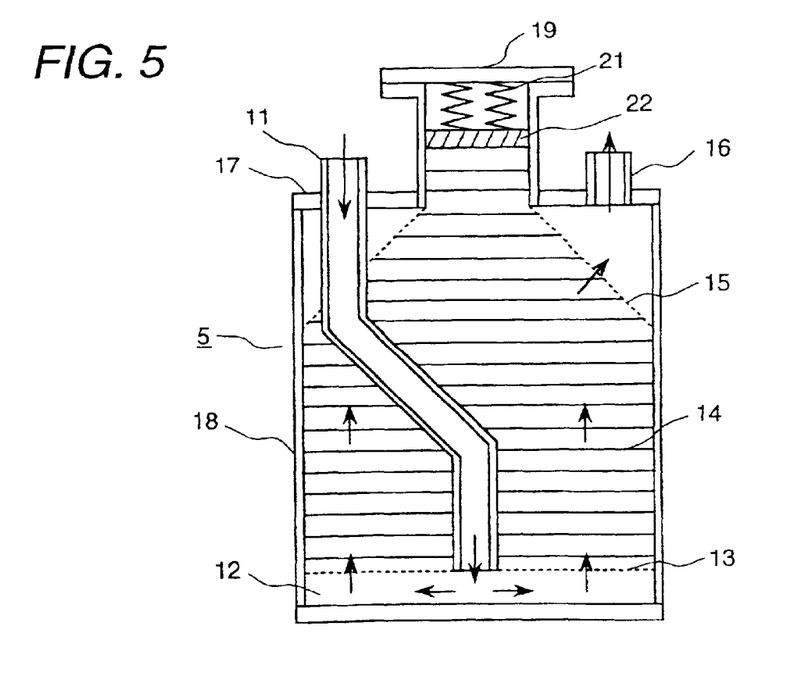
FIG. 5 is a view showing the structure of an embodiment of a catalyst tower in accordance with the present invention.

FIG. 5 is a view showing the structure of another embodiment of a catalyst tower in accordance with the present invention. In this embodiment, the catalyst pushing-down mechanism 20 placed inside the catalyst charging port 19 is composed of springs 21 and a catalyst pushing-down plate 22. In this case, the same effect as that in Embodiment 1 can be obtained. Further, in this embodiment, since there is no need to remove a heavy body of the weight by the structure of pushing down the catalyst using the springs 12, workability of charging the catalyst can be also improved.

Although Embodiment 2, Embodiment 3 and Embodiment 4 show modifications of Embodiment 1 in the inlet pipe 11, the outlet mesh filter 15 and the catalyst pushing-down mechanism 20, respectively, it is possible to combine these. The key point is that the outlet mesh filter 15 is closely contact to the inner wall of the catalyst tower container 18 and to the catalyst charging port 19. In addition, the catalyst pushing-down mechanism 20 may be constructed any structure as far as capable of applying a pressing force to the catalyst, and accordingly the catalyst may be pushed down by air pressure or oil hydraulic pressure.

(Embodiment 5)

Figure 7A:
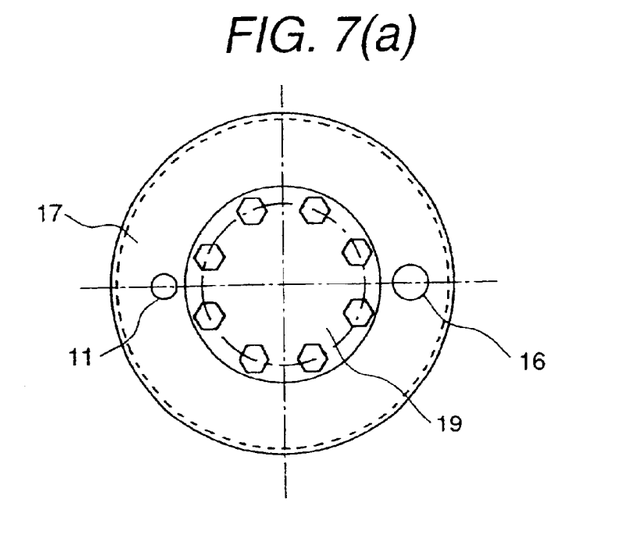
FIG. 7 is a view showing the detailed structure of another embodiment of a catalyst tower in accordance with the present invention.
Figure 7B:
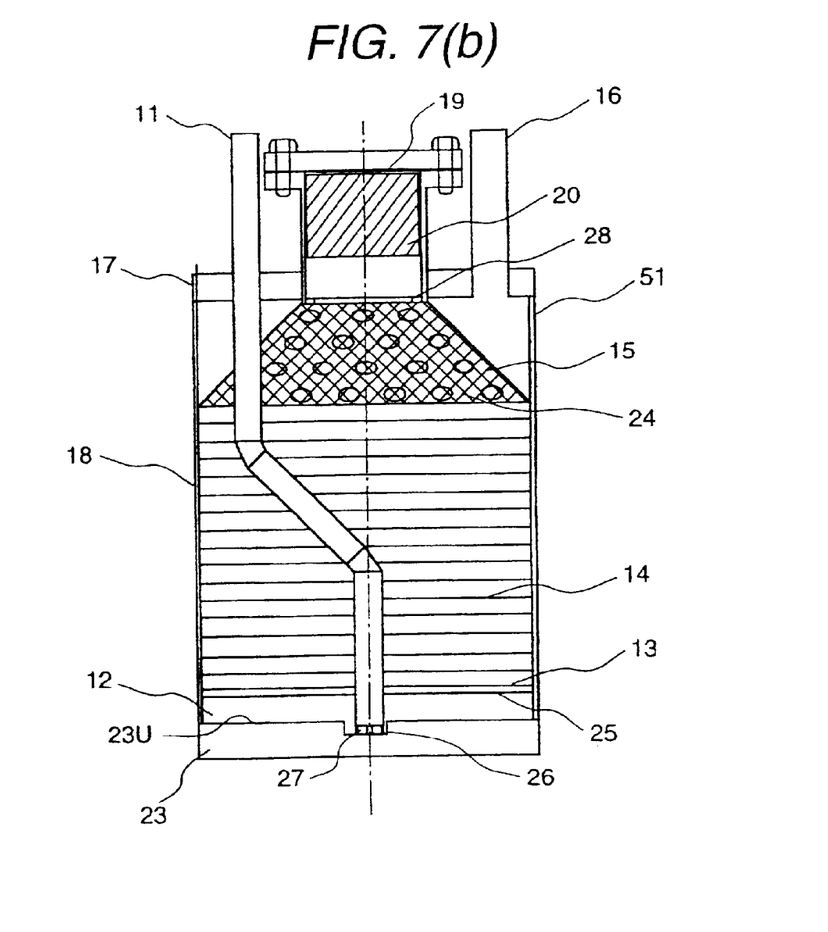
Figure 8:
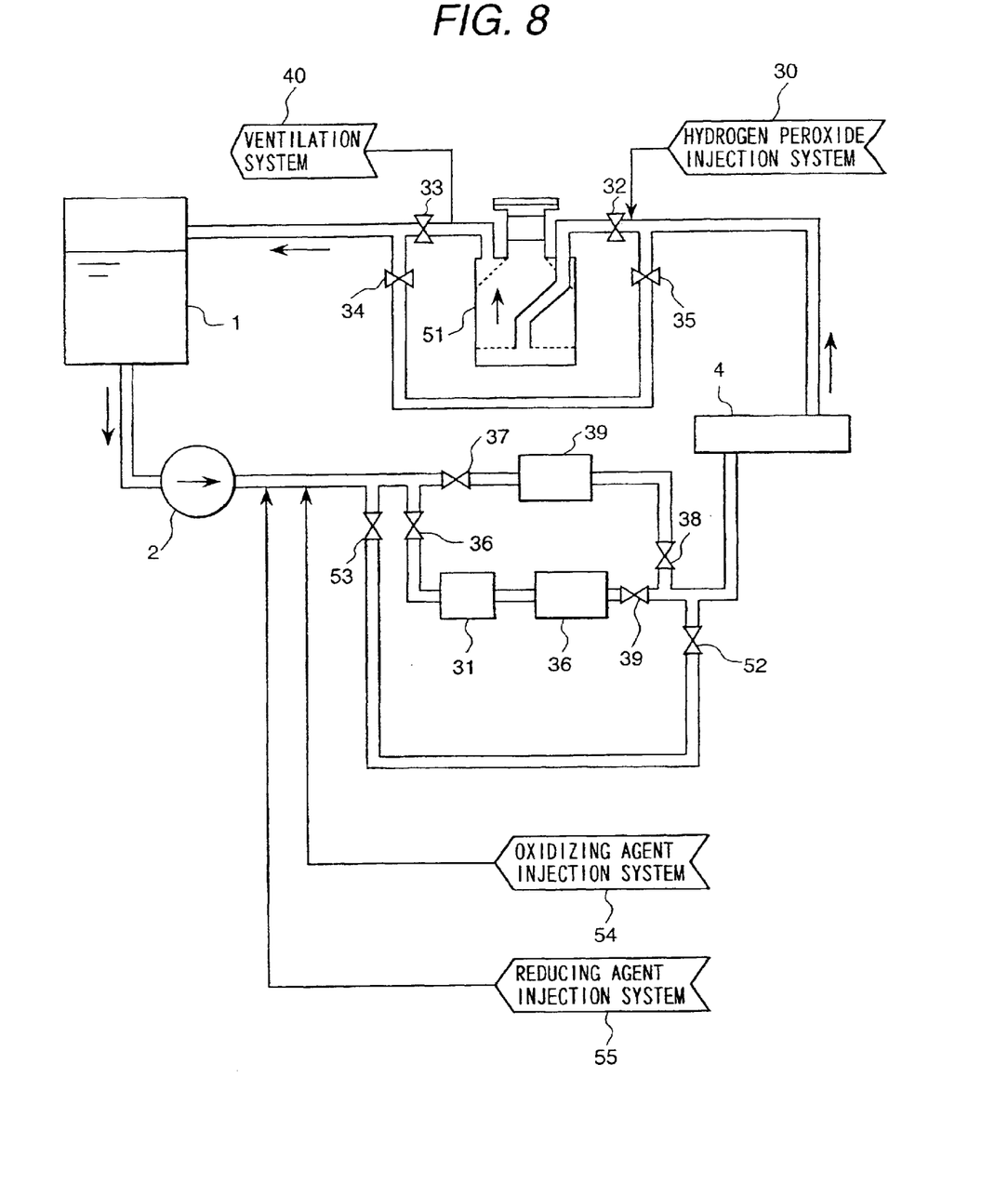
FIG. 8 is a system diagram of Embodiment 5.

FIG. 7 is a view showing the structure of another embodiment of a catalyst tower in accordance with the present invention. FIG. 8 is a diagram showing the overall structure of an embodiment of a chemical decontamination liquid decomposing system in accordance with the present invention. The embodiment of a chemical decontamination liquid decomposing system has five operation modes of oxidation, oxidizing agent decomposition, reduction, reducing agent decomposition and cleaning. Each of the modes will be described below.

Initially the oxidation mode will be described. In this embodiment, potassium permanganate is used as the oxidizing agent. Valves 36, 37, 38, 39, 32 and 33 are closed, and valves 53, 52, 35 and 34 are opened. A chemical decontamination liquid flowing out of an object to be decontaminated 1 is pressurized (pumped up) by a pump 2, and added with the oxidizing agent from an oxidizing agent injection system 54 to be oxidized. After that, the chemical decontamination liquid is heated up by a heater 4, and returned to the object to be decontaminated 1. In this mode, the temperature of the chemical decontamination liquid is gradually increased during recirculating because the liquid is heated by the heater 4.

Next, the oxidizing agent decomposition mode will be described. In this embodiment, oxalic acid is used to decomposing the oxidizing agent. The valves 36, 37, 38, 39, 32 and 33 are closed, and the valves 53, 52, 35 and 34 are opened. The chemical decontamination liquid flowing out of the object to be decontaminated 1 is pressurized (pumped up) by the pump 2, and added with the reducing agent (oxalic acid) from a reducing agent injection system 55 to reduce the oxidizing agent. After that, the chemical decontamination liquid is heated up by a heater 4, and returned to the object to be decontaminated 1. In this mode, the temperature of the chemical decontamination liquid is gradually increased during recirculating because the liquid is heated by the heater 4.

Next, the reduction mode will be described. In this mode, the valves 36, 39, 32, 33, 53 and 52 are closed, and the valves 37, 38, 35 and 34 are opened. The chemical decontamination liquid flowing out of the object to be decontaminated 1 is pressurized (pumped up) by the pump 2, and added with the reducing agent (oxalic acid) from a reducing agent injection system 55 to be reduced. Then the chemical decontamination liquid flows through a cation exchanging resin column 3a to remove impurities. After that, the chemical decontamination liquid is heated up by a heater 4, and returned to the object to be decontaminated 1. In this mode, the temperature of the chemical decontamination liquid is gradually increased during recirculating because the liquid is heated by the heater 4.

Next, the reducing agent decomposition mode will be described. In this mode, the valves 36, 39, 35, 34, 52 and 53 are closed, and the valves 37, 38, 32 and 33 are opened. The chemical decontamination liquid flowing out of the object to be decontaminated 1 is pressurized (pumped up) by the pump 2, and flows through a cation exchanging resin column 3a to to be reduced. Then after heated by the heater 4, the chemical decontamination liquid is added with hydrogen peroxide by a hydrogen peroxide injection system 30. The chemical decontamination liquid is decomposed by the hydrogen peroxide and the catalyst in the catalyst tower 51, and decomposed gas is exhausted through a ventilation system 40. Then, the chemical decontamination liquid is returned to the object to be decontaminated 1. By performing the recirculation operation, the chemical decontamination liquid is decomposed. In this mode, the temperature of the chemical decontamination liquid is also gradually increased during recirculating because the liquid is heated by the heater 4.

Next, the cleaning mode will be described. In this mode, the valves 37, 38, 32, 33, 52 and 53 are closed, and the valves 36, 39, 35 and 34 are opened. The chemical decontamination liquid flowing out of the object to be decontaminated 1 is pressurized (pumped up) by the pump 2, and cooled by a cooler 31. Then, the chemical decontamination liquid passes through a mixed bed ion-exchanging resin column 3b to remove impurities which can not have been completely removed by the cation ion-exchanging resin in the decomposition mode, and then is again heated up by the heater 4.

By repeating the each of the modes described above in order of the oxidation mode, the oxidizing agent decomposing mode, the reduction mode, the reducing agent decomposition mode and the cleaning mode, the chemical decontamination liquid is decomposed. Therein, there are some cases where the each of the modes takes ten and several hours or longer.

Although opening and closing of each of the valves in this embodiment is manually performed by workers, electrically operated opening and closing devices may be used. Using the electrically operated devices is preferable because manpower of the workers can be saved.

The catalyst tower 51 used in this embodiment will be described below in detail. The catalyst tower 51 is shown in FIG. 7.

The chemical decontamination liquid flows through the inlet pipe 11 (in FIG. 8, the pipe in the valve 32 side) of the catalyst tower 51 and is conducted to the lower chamber 12. The flow of the chemical decontamination liquid is distributed inside the lower chamber 12, and passes through the inlet mesh filter 13. The chemical decontamination liquid passed through the inlet mesh filter 13 is decomposed by chemical reaction while being passing between the catalyst 14. The gas generated by the decomposition is passes through the outlet mesh filter 15 together with the chemical decontamination liquid, and flows out of the outlet pipe 16 (in FIG. 8, the pipe in the valve 33 side). When the catalyst is charged in the catalyst tower 51, the catalyst is directly charged by removing the lid of the catalyst charging port 19 and the catalyst pushing-down mechanism 20. The outlet mesh filter 15 of the catalyst tower 15 is welded to the inner side wall of the catalyst tower container 18 and to the lower end portion of the catalyst charging port 19. Further, the outlet mesh filter 15 is also welded to the penetrating portion of the inlet pipe 11. Therefore, the outlet mesh filter 15 has such a structure that there is no gap to make the catalyst 14 flow out to the outlet pipe 16 side. Thereby, it is possible to prevent the catalyst 14 from flowing out.

Furthermore, the catalyst pushing-down mechanism 20 is arranged inside the catalyst charging port 19 of the catalyst tower 5. The catalyst pushing-down mechanism 20 is formed by a weight, and the function of pushing-downward the catalyst 14 is performed by pushing the catalyst using the gravitational force of the weight. By doing so, occurrence of convection of the catalyst 14 caused by the decomposed gas can be prevented. As an example of the catalyst pushing-down mechanism 20, when the catalyst pushing-down mechanism 20 is made of lead and has a thickness of 180 mm, it can push down the catalyst 14 with a pressure approximately 0.02 MPa.

Further, in the catalyst tower, a lower reinforcing plate 25 is placed in the lower side of the inlet mesh filter 13, and an upper reinforcing plate 24 is placed in the upper side of the outlet mesh filter 15. Thereby, the strength of the mesh filters can be increased so as to withstanding the loads produced by the catalyst 14, the catalyst pushing-down mechanism 20 and the fluid flow of the chemical decontamination fluid. By the reinforcement, the deforming amount of the mesh caused by the fluid flow of the chemical decontamination liquid can be decreased compared to that in the case without the lower reinforcing plate 25 and the upper reinforcing plate 24. Both of the lower reinforcing plate 25 and the upper reinforcing plate 24 have through holes so as to make the chemical decontamination liquid easily flow through.

The mesh size of the inlet mesh filter 13 and the outlet mesh filter 15 is formed smaller than the size of the catalyst used. It is appropriate that the size of the mesh filters is about 20 mesh when the size of the catalyst 14 is 4 to 8 mesh, and that the size of the mesh filters is about 40 mesh when the size of the catalyst 14 is 10 to 20 mesh. When the mesh size is further fined, the wire diameter of the mesh is also fined to decrease the strength. Therefore, by laying a 70-mesh mesh filter on a 20-mesh mesh filter, it is possible to fine the mesh size and at the same time to secure the strength of the mesh filter.

The liquid remaining inside the catalyst tower 51 after using the catalyst tower 51 is discharged to the inlet pipe 11 by applying gas pressure to the inside of the catalyst tower 51 from the outlet pipe 16. A groove 26 is formed in the catalyst tower lower plate 23, and the end portion of the inlet pipe 11 is placed on the lower surface of the groove. Holes 27 are formed in the end portion of the inlet pipe 11. By doing so, the holes can be positioned in a level lower than the upper surface 23U of the catalyst tower lower plate. When the catalyst tower 51 is filled with the liquid, the liquid can be pushed out through the inlet pipe 11 by applying gas pressure from the outlet pipe 16. At that time, at least the liquid in the vertically upper side of the upper surface 23U of the catalyst tower lower plate can be discharged by placing the end portion of the inlet pipe 11 in the groove 26. Thereby, since an amount of the decontamination liquid remaining in the catalyst tower 51 after using the catalyst tower can be made small, a radiation dose after using the catalyst tower 51 can be reduced. Furthermore, it is possible to reduce exposure of radiation dose of workers accessing to the catalyst tower 51 after using the catalyst tower 51. The amount of liquid remaining in the catalyst tower 51 can be further reduced by making the diameter of the holes 27 smaller than the depth of the groove 26.

When the diameter of the inlet pipe 11 is large, there are some cases where the remaining liquid can not be sufficiently drained. In such a case, an additional small diameter pipe for draining is provided separately from the inlet pipe 11, and the connecting point of the small diameter pipe is formed in the similar structure to that of the inlet pipe 11. By doing so, the amount of liquid incapable of being drained can be reduced.

Furthermore, the upper surface of the catalyst tower lower plate may be formed in a cone shape having the center at the position where the inlet pipe 11 connects to the catalyst tower lower plate 23. By doing so, when the liquid in the catalyst tower 51 is drained, the liquid flows toward the position where the inlet pipe 11 connects to the catalyst tower lower plate 23. Therefore, the drainage can be made easy.

According to the embodiments described above, the catalyst can be directly charged from the catalyst charging port into the catalyst tower container. Further, since the outlet mesh filter needs not to be formed in a detachable structure nor a movable structure by placing the catalyst pushing-down mechanism inside the catalyst charging port, the outlet mesh filter can be formed in the structure of closely attached to the inner wall of the catalyst tower container and to the catalyst charging port. Therefore, it is possible to certainly prevent the catalyst from flowing out of the outlet mesh filter. Furthermore, since the catalyst can be certainly pushed down by the catalyst pushing-down mechanism placed inside the catalyst charging port, it is possible to prevent occurrence of convection of the catalyst due to the decomposed gas.

What is claimed is:

1. A chemical decontamination liquid decomposing system having a catalyst tower for decomposing a chemical decontamination liquid, wherein
    said catalyst tower comprises:
        an inlet pipe for making the chemical decontamination liquid flow into said catalyst tower; a catalyst for decomposing the chemical decontamination liquid flowing through said inlet pipe;
        an outlet pipe for making the chemical decontamination liquid passed through said catalyst flow out of said catalyst tower;
        an inlet mesh filter arranged between said inlet pipe and said catalyst;
        an outlet mesh filter arranged between said catalyst and said outlet pipe;
        a catalyst charging port for charging said catalyst, said outlet mesh filter being arranged so as to closely attached to an inner surface of said catalyst tower and to an inner surface of said catalyst charging port; and
        a catalyst pushing-down mechanism for suppressing convection of said catalyst, said catalyst pushing-down mechanism being arranged inside said catalyst charging port.

2. A catalyst tower comprising a catalyst tower container, a space surrounded by meshes and part of said catalyst tower container being filled with a catalyst for decomposing a chemical decontamination liquid, wherein said catalyst tower container comprises:
    an inlet pipe for conducting said chemical decontamination liquid from the outside of said catalyst tower container and discharging said chemical decontamination liquid into a lower space inside said catalyst tower container, said lower space being located in a region in the lower side of said catalyst in the vertical direction and separated from said catalyst by said mesh; and
    an outlet pipe for conducting said chemical decontamination liquid passed through said catalyst from an upper space inside said catalyst tower container to the outside of said catalyst tower container, said upper space being located in a region in the upper side of said catalyst in the vertical direction and separated from said catalyst by said mesh.

3. A catalyst tower according to claim 2, wherein said catalyst is pressed by a weight from a part of a space surrounded by said mesh and part of said catalyst tower container.

4. A catalyst tower according to claim 2, wherein said mesh is formed by laying meshes having different size one on top of another.

5. A catalyst tower according to claim 2, wherein said mesh is laid together with a reinforced plate formed by making through holes in a metallic plate.

6. A catalyst tower according to claim 2, wherein an end portion of said inlet pipe inside said catalyst tower container is opened to an inside of a groove formed on a vertically lower side surface of said catalyst tower container.

7. A catalyst tower comprising a cylindrical catalyst tower container having two surfaces of a first surface and a second surface in both ends of said catalyst tower container, said first surface being positioned in the upper side of said second surface in the vertical direction, which comprises:
    a first mesh and a second mesh for separating a space inside said catalyst tower container, said first mesh and said second mesh being arranged in order of said first surface, said first mesh, said second mesh and said second surface from the upper side in the vertical direction;
    a first pipe for conducting a chemical decontamination liquid from the outside of said catalyst tower container to a space between said second surface and said second mesh, said first pipe being connected to said catalyst tower container;
    a second pipe for conducting said chemical decontamination liquid from a space between said first surface and said first mesh to the outside of said catalyst tower container, said second pipe being connected to said catalyst tower container;
    a charging path for charging a catalyst into a first space between said first mesh and said second mesh, said first space being filled with said catalyst for decomposing said chemical decontamination liquid; and
    a weight for applying a pressure force to said catalyst, said weight being in contact with part of said catalyst charged in a part of said charging path and said first space.

8. A catalyst tower according to claim 7, wherein said charging path is connected to a vertically upper portion of said first space by a first connection part, and a cross-sectional area in the horizontal direction of said first space is increased toward the lower side in the vertical direction from said first connection part.

9. A catalyst tower according to claim 7, wherein said mesh is formed by laying meshes having different mesh size one on top of another.

10. A catalyst tower according to claim 7, wherein said mesh is laid together with a reinforced plate formed by making through holes in a metallic plate.

11. A catalyst tower according to claim 7, wherein an end portion of said first pipe inside said catalyst tower container is opened to an inside of a vertically downward depressed groove formed on a surface of said second surface in the inner side of said catalyst tower container.

12. A catalyst tower comprises:
- an inlet pipe for making the chemical decontamination liquid flow into said catalyst tower;
- a catalyst for decomposing the chemical decontamination liquid flowing through said inlet pipe;
- an outlet pipe for making the chemical decontamination liquid passed through said catalyst flow out of said catalyst tower;
- an inlet mesh filter arranged between said inlet pipe and said catalyst;
- an outlet mesh filter arranged between said catalyst and said outlet pipe; and
- a catalyst pushing-down mechanism for suppressing convection of said catalyst, said catalyst pushing-down mechanism being arranged inside said catalyst charging port.

13. A catalyst tower comprises:
- an inlet pipe for making the chemical decontamination liquid flow into said catalyst tower;
- a catalyst for decomposing the chemical decontamination liquid flowing through said inlet pipe;
- an outlet pipe for making the chemical decontamination liquid passed through said catalyst flow out of said catalyst tower;
- an inlet mesh filter arranged between said inlet pipe and said catalyst;
- an outlet mesh filter arranged between said catalyst and said outlet pipe;
- a catalyst charging port for charging said catalyst, said outlet mesh filter being arranged so as to closely attached to an inner surface of said catalyst tower and to an inner surface of said catalyst charging port; and
- a catalyst pushing-down mechanism for suppressing convection of said catalyst, said catalyst pushing-down mechanism being arranged inside said catalyst charging port.

* * * * *